(12) United States Patent
Migdal et al.

(10) Patent No.: US 12,062,236 B2
(45) Date of Patent: Aug. 13, 2024

(54) IMAGE/VIDEO ANALYSIS WITH ACTIVITY SIGNATURES

(71) Applicant: NCR Voyix Corporation, Atlanta, GA (US)

(72) Inventors: Joshua Migdal, Wayland, MA (US); Vikram Srinivasan, North Billerica, MA (US)

(73) Assignee: NCR Voyix Corporation, Atlanta, GA (US)

( * ) Notice: Subject to any disclaimer, the term of this patent is extended or adjusted under 35 U.S.C. 154(b) by 59 days.

(21) Appl. No.: 17/952,587

(22) Filed: Sep. 26, 2022

(65) Prior Publication Data

US 2023/0018877 A1 Jan. 19, 2023

Related U.S. Application Data

(60) Continuation of application No. 17/541,716, filed on Dec. 3, 2021, which is a division of application No. (Continued)

(51) Int. Cl.
*G06V 20/40* (2022.01)
*G06F 16/71* (2019.01)
(Continued)

(52) U.S. Cl.
CPC .............. *G06V 20/47* (2022.01); *G06F 16/71* (2019.01); *G06F 16/739* (2019.01); *G06F 18/24* (2023.01);
(Continued)

(58) Field of Classification Search
None
See application file for complete search history.

(56) References Cited

U.S. PATENT DOCUMENTS

2006/0078047 A1   4/2006  Shu et al.
2008/0294017 A1*  11/2008  Gobeyn ................. A61B 5/445
                                                         600/301
(Continued)

FOREIGN PATENT DOCUMENTS

JP        2004304676 A  * 10/2004

OTHER PUBLICATIONS

Shukla D, Jha RK. Robust motion estimation for night-shooting videos using dual-accumulated constraint warping. Journal of Visual Communication and Image Representation. Jul. 1, 2016;38:217-29. (Year: 2016).*

(Continued)

*Primary Examiner* — Emily C Terrell
*Assistant Examiner* — Nathan J Bloom
(74) *Attorney, Agent, or Firm* — Schwegman Lundberg & Woessner, P.A.

(57) ABSTRACT

Video frames from a video are compressed into a single image or a single data structure that represents a unique visual flowprint or visual signature for a given activity being modeled from the video frames. The flowprint comprises a computed summary of the original pixel values associated with the video frames within the single image and the flowprint is specific to movements occurring within the video frames that are associated with the given activity. In an embodiment, the flowprint is provided as input to a machine-learning algorithm to allow the algorithm to perform object tracking and monitoring from the flowprint rather than from the video frames of the video, which substantially improves processor load and memory utilization on a device that executes the algorithm, and substantially improved responsiveness of the algorithm.

20 Claims, 8 Drawing Sheets

Related U.S. Application Data

16/943,140, filed on Jul. 30, 2020, now Pat. No. 11,475,669.

(51) Int. Cl.

| | | |
|---|---|---|
| *G06F 16/738* | (2019.01) | |
| *G06F 18/24* | (2023.01) | |
| *G06N 20/00* | (2019.01) | |
| *G06T 7/269* | (2017.01) | |
| *G06V 10/22* | (2022.01) | |
| *G06V 10/72* | (2022.01) | |
| *H04N 7/18* | (2006.01) | |

(52) U.S. Cl.
CPC ............. *G06N 20/00* (2019.01); *G06T 7/269* (2017.01); *G06V 10/22* (2022.01); *G06V 10/72* (2022.01); *H04N 7/18* (2013.01); *G06T 2207/10016* (2013.01); *G06T 2207/20081* (2013.01); *G06T 2207/30196* (2013.01); *G06T 2207/30232* (2013.01); *G06V 20/44* (2022.01)

(56) References Cited

U.S. PATENT DOCUMENTS

| | | | |
|---|---|---|---|
| 2015/0104149 | A1 | 4/2015 | Sim et al. |
| 2019/0057508 | A1 | 2/2019 | Bose et al. |
| 2019/0258851 | A1* | 8/2019 | Rajan .................. G06T 7/75 |
| 2020/0053378 | A1* | 2/2020 | Wang .................. G06T 5/70 |
| 2020/0349820 | A1* | 11/2020 | Speagle ........... G08B 13/19658 |

OTHER PUBLICATIONS

R. Lienhart and A. Wernicke, "Localizing and segmenting text in images and videos," in IEEE Transactions on Circuits and Systems for Video Technology, vol. 12, No. 4, pp. 256-268, Apr. 2002, doi: 10.1109/76.999203. (Year: 2002).*

Abebe G, Cavallaro A, Parra X. Robust multi-dimensional motion features for first-person vision activity recognition. Computer Vision and Image Understanding. Aug. 1, 2016;149:229-48. (Year: 2016).*

M. Ajmal, M. Naseer, F. Ahmad and A. Saleem, "Human Motion Trajectory Analysis Based Video Summarization," 2017 16th IEEE International Conference on Machine Learning and Applications (ICMLA), Cancun, Mexico, 2017, pp. 550-555, doi: 10.1109/ICMLA.2017.0-103. (Year: 2017).*

Emami A, Dadgostar F, Bigdeli A, Lovell BC. Role of spatiotemporal oriented energy features for robust visual tracking in video surveillance. In2012 IEEE Ninth International Conference on Advanced Video and Signal-Based Surveillance Sep. 18, 2012 (pp. 349-354). IEEE. (Year: 2012).*

Žemgulys J, Raudonis V, Maskeliūnas R, Damaševičius R. Recognition of basketball referee signals from real-time videos. Journal of Ambient Intelligence and Humanized Computing. Mar. 2020;11:979-91. (Year: 2020).*

Senthil Murugan A, Suganya Devi K, Sivaranjani A, Srinivasan P. A study on various methods used for video summarization and moving object detection for video surveillance applications. Multimedia Tools and Applications. Sep. 2018;77(18):23273-90. (Year: 2018).*

EP Examination Report—Apr. 4, 2023.

* cited by examiner

IMAGE/VIDEO ANALYSIS WITH ACTIVITY SIGNATURES

CROSS-REFERENCE TO RELATED APPLICATION

This application is a continuation of U.S. patent application Ser. No. 17/541,716, filed Dec. 3, 2021, which is a division of U.S. patent application Ser. No. 16/943,140, filed on Jul. 30, 2020, which applications and publications are incorporated herein by reference in their entirety.

BACKGROUND

Deep learning has been widely used and successful at image classification tasks. However, due to how computationally expensive machine learning can be, deep learning has largely been unable to be applied to video classification tasks.

Unlike a single image, the content of video changes over time. In other words, there is a temporal aspect to analyzing video that is not present in still images. So, while an image understanding task may involve understanding what is in the image, a video understanding task requires determining an object that is in the video at a given time and determining how the object changes over time from frame to frame within the video.

This temporal based analysis, which is required for understanding video activity, presents significant challenges to current machine-learning approaches. The search space required for video analysis is exponentially larger than what is needed for still image analysis; such that if a machine-learning algorithm is not meticulously constructed and configured appropriately, intractable problems can be encountered with learning and evaluation for videos processed by the algorithm.

Furthermore, even with an optimal machine-learning algorithm for video analysis, the sheer data size of the corresponding video frames and the number of features being tracked from the frames prevent the algorithm from delivering timely results. Typically, there can be more than 30 frames (30 images) every second, a single minute of video contains almost 2,000 individual images. Moreover, hardware resources, such as processor load and memory utilization become extremely taxed while the algorithm processes the video frames.

As a result, real time machine-learning applications are largely not feasible and not practical in the industry.

SUMMARY

In various embodiments, methods and a system for image/video analysis with activity signatures are presented.

According to an embodiment, a method for image/video analysis with activity signatures is provided. For example, video frames are obtained from a video and a single image is generated from the video frames. The single image is provided as a visual flowprint for an activity that was captured in the video frames.

DETAILED DESCRIPTION

Figure 1A:
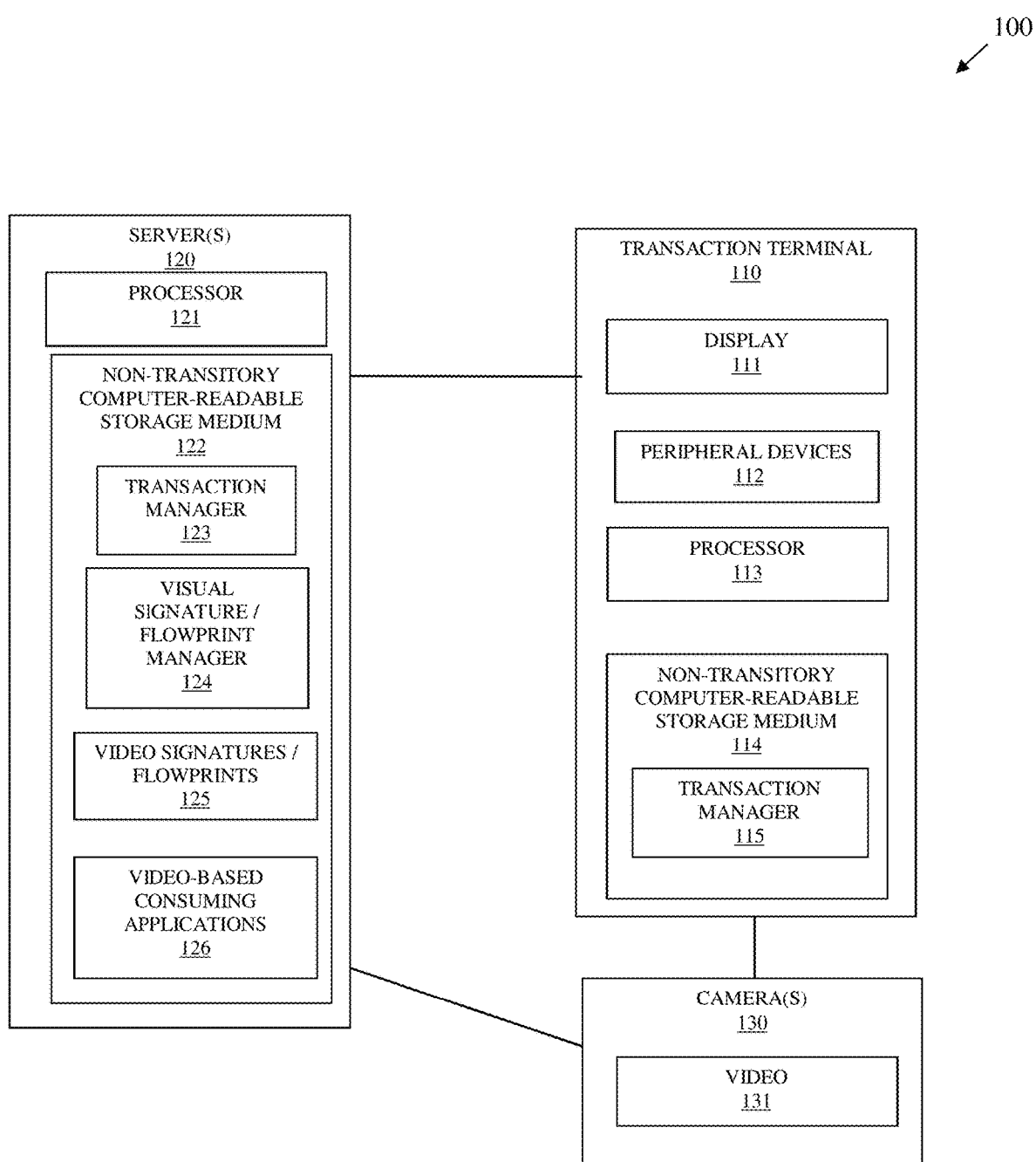
FIG. 1A is a diagram of a system for image/video analysis with activity signatures, according to an example embodiment.

FIG. 1A is a diagram of a system 100 for image/video analysis with activity signatures, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of image/video analysis with activity signatures, presented herein and below.

System 100 includes a transaction terminal 110 a server 120 and one or more cameras 130.

Terminal 110 comprises a display 111, peripheral devices 112, a processor 113, and a non-transitory computer-readable storage medium 114. Medium 114 comprises executable instructions for a transaction manager 115.

Server 120 comprises a processor 121 and a non-transitory computer-readable storage medium 122. Medium 122 comprises executable instructions for a transaction manager 123, a visual signature/flowprint manager 124, and one or more video-based consuming applications 126. Medium 122 also comprises video signatures/flowprints 125 produced by visual signature/flowprint manager 124 and provided as input to video-based consuming applications 126.

The camera 130 captures video 131 of a transaction area associated with terminal 110. The video can be streamed in real time to server 120 or other network-based location/file where it is accessible to visual signature/flowprint manager 124 for analysis.

As will be illustrated more completely herein and below, system 100 permits multiple frames of video to be analyzed for producing a video signature or a visual flowprint for a given activity being monitored within the video and all its corresponding frames (individual images). The produced activity signature or visual flowprint is significantly smaller in size than the original video frames from which it was derived, and the activity signature or visual flowprint comprises more descriptive features and relevant data associated with the given activity. The signature/flowprint can subsequently be processed by machine-learning algorithms and/or other consuming applications resulting in substantial processor throughput improvements and resulting in substantial memory utilization improvements over what has been achieved in the industry.

As used herein the terms and phrases "visual flowprint," "video signature," "activity signature," "flowprint," and "signature" may be used interchangeably and synonymously. These refer to a novel data structure or image that is constructed in a specific manner (described herein and below) to represent a monitor activity from video frames of a video 131.

Visual signature/flowprint manager 124 analyzes captured video 131 of a transaction area for terminal 110 and produces a flowprint. Fames of the video 131 are summarized by visual signature/flowprint manager 124. Visual signature/flowprint manager 124 creates an n-dimensional numerical array representing the summarization of a piece of the video 131 having a length T, where n is not dependent or not significantly dependent on T.

The length of video, T, can be expressed in units of time or, equivalently in number of frames. In this manner, T may also be referred to herein as the total number of frames in the video 131 (and "t" as an indexed position within the video 131), though they can be used interchangeably, and the distinction will only be made when necessary. Suppose the video in question has a resolution of 640×480 with 3 color channels and a duration of length T. A naïve way of creating a flowprint, then, is to simply "stack" the frames of video into a 4-dimensional (n=4) data structure of size (T,640,480, 3). By convention, the 1st dimension is the time axis, with each "row" representing the summary of a single frame of video. This first dimension can be referred in all cases equivalently as the time-axis, the height, the scanlines, or rows of the flowprint. The other n−1 dimensions are used to summarize each frame of video. In this naïve flowprint example, the summarization takes the form of the identity transform. This illustrates the point that a flowprint does not necessarily require a simplification, reduction, or elimination of any information contained in the video.

The processing discussed below with respect to FIGS. 1B-1H is performed by the visual signature/flowprint manager 124. The produced flowprints can be provided as input to a variety of video-based consuming applications 126, such as video-based machine-learning algorithms or applications.

Figure 1B:
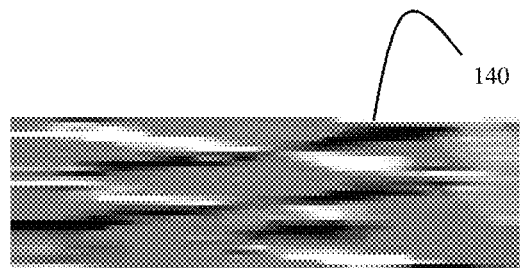
FIG. 1B is a diagram of an example visual flowprint or activity signature, according to an example embodiment.

FIG. 1B is a diagram of an example visual flowprint 140 or activity signature 140, according to an example embodiment.

Flowprint 140 summarizes a particular activity captured within the video 131. An "activity" is defined as a movement of a person, object, group, or any combination thereof, whose action is repetitive, repeatable, or otherwise forms a pattern, which can be identified and learned (through machine-learning or rule-based processing associated with consuming applications 126.

It is to be noted that the activity, which is to be learned, is domain specific, such that the examples given herein and below are non-limiting and presented for illustration within a given retail checkout domain. Other domains may be used without departing from the beneficial teachings presented herein.

Any given flowprint typically comprises at least 2 dimensions, one dimension (first dimension, scanline, y-axis, or rows) represents time. In this way, each scanline represents a summarization of a single frame of the video 131. When a flowprint is represented as an image, the height of the image is the equivalent length of the video 131 (height "h"=T).

An image comprises two dimensions height and width forming a matrix of pixel values. Video represents three dimensions by stringing multiple images together sequentially through time.

The flowprint 140 represents the frames of the video compressed into a series of one-dimensional stacked frames. The column pixel values for any given frame (image) are summed, averaged, or otherwise computed to obtain a single pixel value per column, such that a single image or frame is compressed into a single row of numerical pixel values (each pixel value in the row representing a summarization/computation of a specific column of pixel values present in the original frame or image). Each frame is compressed into a novel data structure having a height or just 1. Moreover, each frame is included as an additional row stacked on the previous row. So, the total number of rows in flowprint 140 is equivalent to the total number of frames captured in the portion of video 131 that corresponds to a given activity. Visually, the flowprint 140 may be viewed as a single two-dimensional image, which is representative of all the corresponding frames of the video 131.

Figure 1C:
FIG. 1C is an example overhead image of a video frame captured for a transaction area of a transaction terminal, according to an example embodiment.

FIG. 1C is an example overhead image of a video frame captured for a transaction area of a transaction terminal, according to an example embodiment.

For purposes of illustration, suppose a given video 131 or video feed 131 captured by an overhead camera 130 of a transaction area associated with a cashier at a Point-Of-Sale (POS) terminal 110. Now suppose that the retailer desires to monitor the cashier's activity associated with bagging items within the transaction area. Here, the motion of the cashier and the item from a barcode scanner into a bagging area or region is tracked (the bagging area is to the left of the cashier (cashier's left)) in FIG. 1C.

Figure 1D:
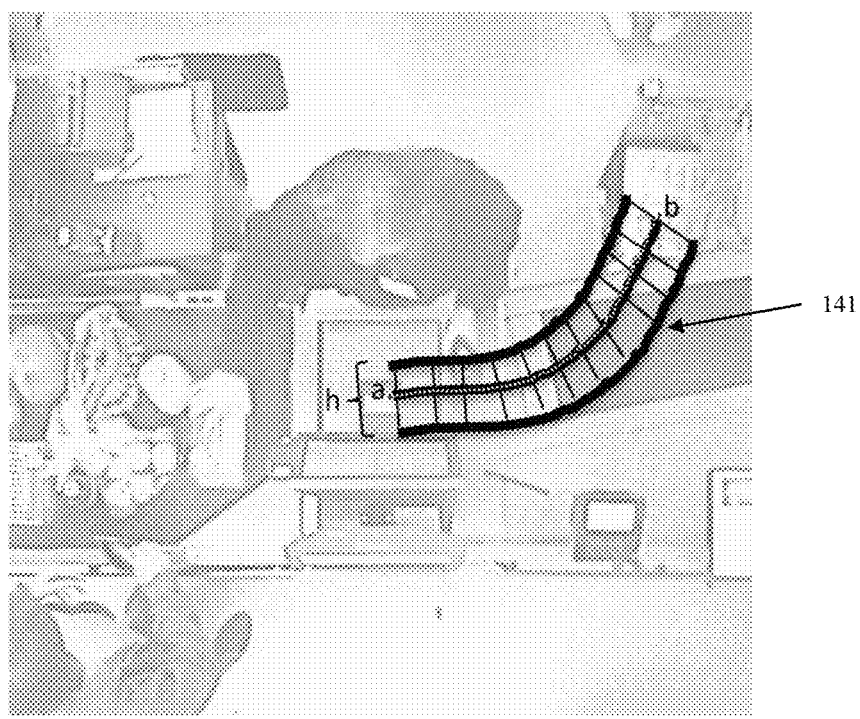
FIG. 1D is a diagram of an expected flowprint's path through multiple video frames superimposed on top of the video frame of FIG. 1C, according to an example embodiment.

The expected motion of such an action follows a path illustrated in FIG. 1D.

FIG. 1D is a diagram of an expected flowprint's path 141 through multiple video frames superimposed on top of the video frame of FIG. 1C, according to an example embodiment.

The path 141 of a flowprint is what is expected for an activity associated with bagging an item. The activity begins directly after the item is scanned. The item follows a path 141 from the scanner of terminal 110 to a bagging region directly to the cashier's left. Each scanline of the corresponding flowprint for this activity is derived from summary statistics extracted from column pixels orthogonal to the path 141 from "a" to "b." The length of the path 141 from "a" to "b" determines the width of the scanline and hence the width of the corresponding flowprint. The height)h) is the height of the column of pixels orthogonal to the path 141 that is used to extract the summary statistics.

In FIG. 1D, the motion begins at point a, continues along the designated path 141, and terminates at point b. The number of points along the path 141 from a to b is the width "w." A point "p" can be indexed according to its position along this path as well as its position in time of the video: $p_{t,x}$ where x is between 0 and w−1, and t is between 0 and T−1.

For a flowprint tracking one summary variable, this results in a flowprint with dimensions T×w: each row represents one scanline of length w summarizing the activity within the path 141 taken through each frame of video. An example of such a flowprint 140 is given in FIG. 1B.

To compute the summary statistic value at point $p_{t,x}$ in the resulting flowprint (x is the point along path 141 and has a value between 0 and w−1 and t is the play position in the frames within the video 131 and has a value between 0 and T−1), the pixel values found on the line orthogonal to the path 141 at position x are aggregated within the image/frame at time t in the video. The corresponding column of pixels has a height h. When determining the summary statistic to use, two choices must be made: what is the value to be summarized and what is the statistic to be used. The value to be summarized can be as simple as the brightness or color values of each pixel in the column, or the value can be of some other quantity. Some examples of summary statistics that may be used by visual signature/flowprint manager 124 comprise: the average brightness or color of the pixel column, minimum pixel values, maximum pixel values, standard deviations, and/or any other statistics.

In an embodiment, the value used for any given point of the flowprint is derived from optical flow of the frames. Using optical flow has a variety of benefits because: it can be computed densely. That is, a value can be derived for each pixel in the image. Furthermore, it can be computed efficiently, and it is not a computationally expensive calculation. Optical flow also has a benefit of being a robust estimator of motion and the pattern of motion that is largely impervious to many of the common challenges in applying computer vision to real-world scenarios; such challenges include diverse and changing lighting conditions, shadows, reflections, specular highlight, occlusions, camouflaging, and other conditions.

Figure 1E:
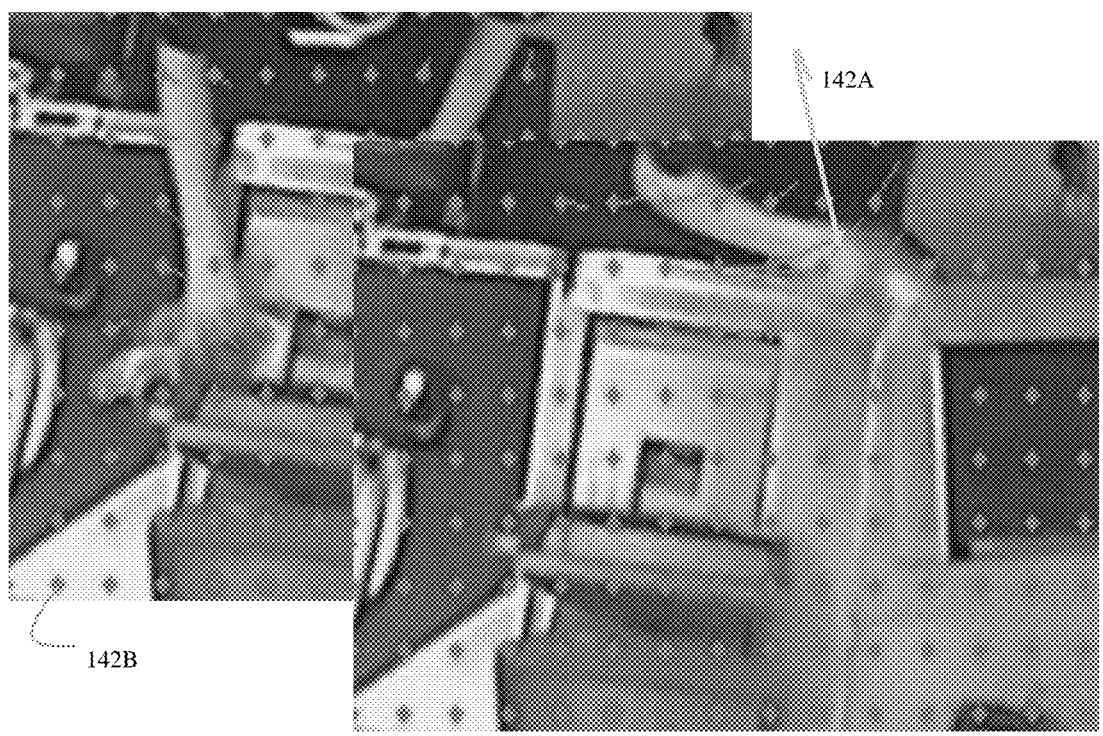
FIG. 1E is a diagram of images comprising superimposed optical flow data representing movement of optical data from one frame to a next frame, according to an example embodiment.

FIG. 1E is a diagram of images comprising superimposed optical flow data representing movement of optical data from one frame to a next frame, according to an example embodiment.

When using optical flow as the value for the summary statistic, optical flow is computed across the video 131. In an embodiment, the summary statistic is computed with respect to pixel values of a bounding box fitting the path 141.

The flows across each column orthogonal to the path 141 at each point along the path 141 is aggregated. Recall that each column has h pixels in it and so the aggregation will take place over those h flows. In one embodiment, the flows are projected down to the axis of the path 141 at each point p, resulting in a single value per flow pixel (and h values in total per column per path point, there being w path points). This projection is useful as it captures the magnitude of the activity along the path 141. The "axis of the path" at point p is given to mean the tangent of the curve representing the path 141 at p. Any sort of summary statistic can then be used to aggregate the h values down to the single point value at p that will take its place in the resulting flowprint at position (t,x). In an embodiment, the sum of values is used.

This is, in fact, how the flowprint shown in FIG. 1 was computed. That flowprint is 60 rows high and 200 columns wide and is represented as a grayscale image. A grayscale image captures a single value per pixel. The 60 rows represent 60 frames of video summarized. The 200 columns represents the length of the path within the video. Each grayscale value represents either flow "towards the starting point a" along the path in the case of a black color, or "towards the ending point b" along the path in the case of a white color. The stronger the color, the stronger the flow along the path at that point either towards a or b.

It is to be noted that other variations are possible as well. By way of further nonlimiting examples, both axes of the optical flow can be used, for example, which would result in a flowprint of 2 channels per pixel. What is meant by this is that the resultant flowprint would be a 3-dimensional numerical array, with the first dimension of size T, the second dimension of size w, and with the last dimension of size 2, representing the 2 axes of the optical flow.

The axes can either be projected along and orthogonal to the path 141, or can be image axis-oriented, or used via any other basis vectors.

In a similar way, using some summary statistic to, for example, computer average color would result in a 3-channel flowprint.

It is to be noted that other values may be used as well. The above-noted approach can be combined with computer vision techniques such as background subtraction, tracking, silhouettes and blob analysis to track activity through a video.

The approach described can also be used with feature-based approaches. For instance, SIFT-based features can be extracted from each frame of video and uses as the value to be summarized.

In FIG. 1E the optical flow data is shown as the diamond shapes 142B illustrating no movement through the frames, 142A illustrating movement downward and to the left with a magnitude illustrated in the length of the line associated with the corresponding diamond shape.

Figure 1F:
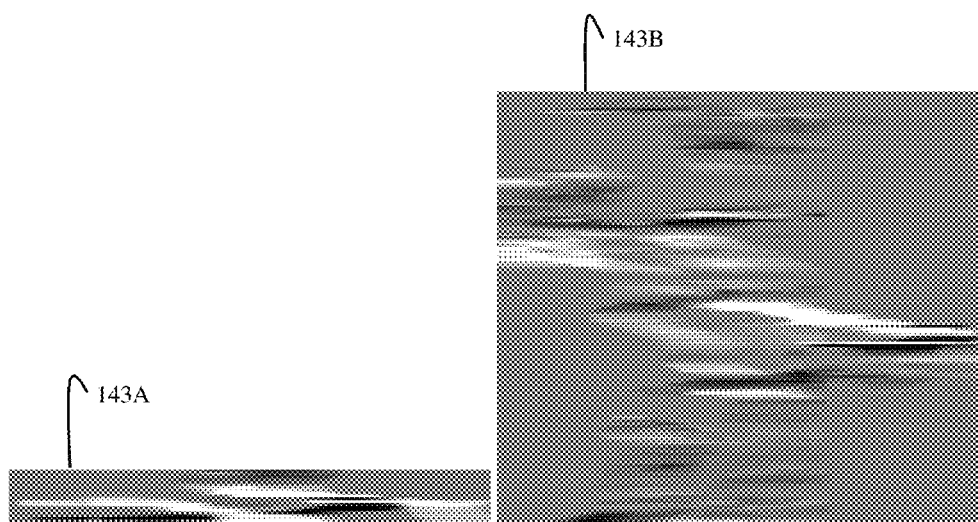
FIG. 1F is a diagram of two flowprints associated with activities that took different amounts of time, according to an example embodiment.

FIG. 1F is a diagram of two flowprints associated with activities that took different amounts of time, according to an example embodiment.

Flowprints derived from activities with different durations are illustrated in FIG. 1F. In flowprint 143A, the activity that is being monitored took a very small amount of time (hence the small height of flowprint 143A). In the second flowprint 143B, the same type of activity took significantly longer (hence the greater height of flowprint 143B when compared against flowprint 143A). This results in two flowprints 143A and 143B whose heights differ dramatically. This poses a problem to many machine learning approaches that require all inputs to be of a same size.

It is often necessary in machine learning frameworks to ensure that all inputs are the same size. When dealing with video, this is often quite challenging. Videos are not standard lengths. Activities within videos do not all take the same amount of time.

FIG. 1F illustrates such a scenario where a same type of activity took significantly different amounts of time to complete. It may not be possible to use these flowprints 143A and 143B as input to a same machine-learning classifier as-is since they are of different sizes.

There are various approaches to trying to normalize videos, including strategically adding and removing frames to ensure a consistent input size. However, these are not without issues. For instance, if you remove frames, the resulting video will be jerky where the frames were removed. This has many consequences, not least of which is inconsistent flow estimates between one frame and another.

If frames must be added, via duplicating the nearest frame, the same issues with video presentation and flow estimates occur. When adding frames, one can interpolate between the two frames to try to mitigate such issues, but other artifacts then manifest that may adversely affect results.

The approach proposed here, and one key benefit to the teachings presented herein, is to normalize the flowprint rather than the video. Normalization involves ensuring that all inputs are sanitized in certain ways to ensure as much equality in the data representation as possible. This ensures that a classifier is trained, and evaluated, only on the differences intrinsic to the activity being modeled by the flowprint, rather than by discrepancies in the data representation.

Figure 1G:
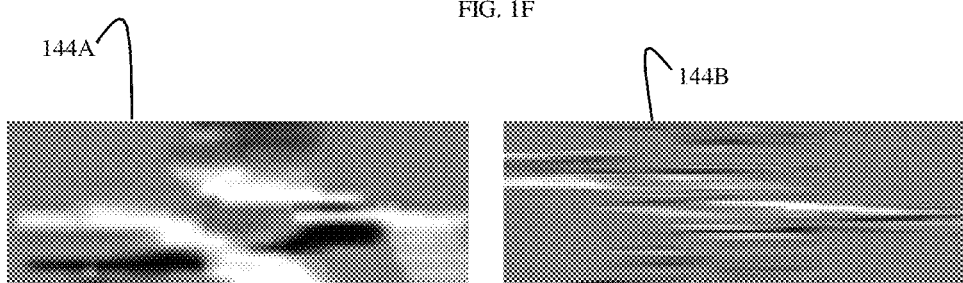
FIG. 1G is a diagram of two flowprints associated with activities that took different amounts of time normalized to a same size, according to an example embodiment.

Since flowprints can typically be represented as images, the act of normalization reduces to image processing and all the tools and methods available in that domain can be brought to bear on the flowprint normalization task. For example, to normalize for time differences, such as those shown in FIG. 1F, an image resize operation can be performed. Such an operation could be nearest-neighbor, or it could use a more advanced method such as bicubic interpolation. FIG. 1G presents an example of size normalized flowprints for FIG. 1F.

FIG. 1G is a diagram of two flowprints associated with activities that took different amounts of time normalized to a same size, according to an example embodiment.

Since flowprints are typically represented as images, image processing techniques can be used for data normalization. In this example, two flowprints 143A and 143B representing similar activities of different durations are resized as flowprints 144A and 144B so that they are both the same size. In this way, what was a smaller flowprint 143A becomes 144A and what was a larger flowprint 143B becomes 144B. The two normalized flowprints 144A and 144B can now be processed in many existing machine-learning frameworks/applications that require inputs of a constant size.

Because flowprints 143A and 143B are represented as images, it is also possible to scale up the time axis, or any of the other dimensions for that matter, by using super-resolution enhancing techniques. Any such method can be used to normalize for the size of the flowprints 143A and 143B into normalized flowprints 144A and 144B.

Furthermore, the data values themselves can be normalized. Color balancing, brightness and contrast adjustments, and any of the other myriad image processing tools can be used to normalize the visual appearance of the flowprints. This is analogous to the more general approach of data whitening and, indeed, those approaches that are standard in statistical modeling can also be used here.

This is useful in the optical flow-based technique to normalize for different video frame rates. For instance, suppose one is calculating the flow of a vehicle moving at a constant velocity. If that vehicle is being recorded by two cameras, one with a frame rate of 12 fps (Frames Per Second) and one with a frame rate of 24 fps, then between any two frames of the 12 fps video file, the motion will be twice the magnitude as flow calculated using adjacent frames of the 24 fps video that is recording the same vehicle.

In terms of image representation, since the magnitude of the shades of gray from black to white indicate magnitude of velocity toward and away from the starting point respectively, the image representation of the flowprint in the 12 fps should appear with higher contrast than the one recorded at 24 fps.

Among the various approaches that can be used to correct for this, simple color manipulation using image processing techniques provides a simple and efficient way of normalization the data.

Figure 1H:
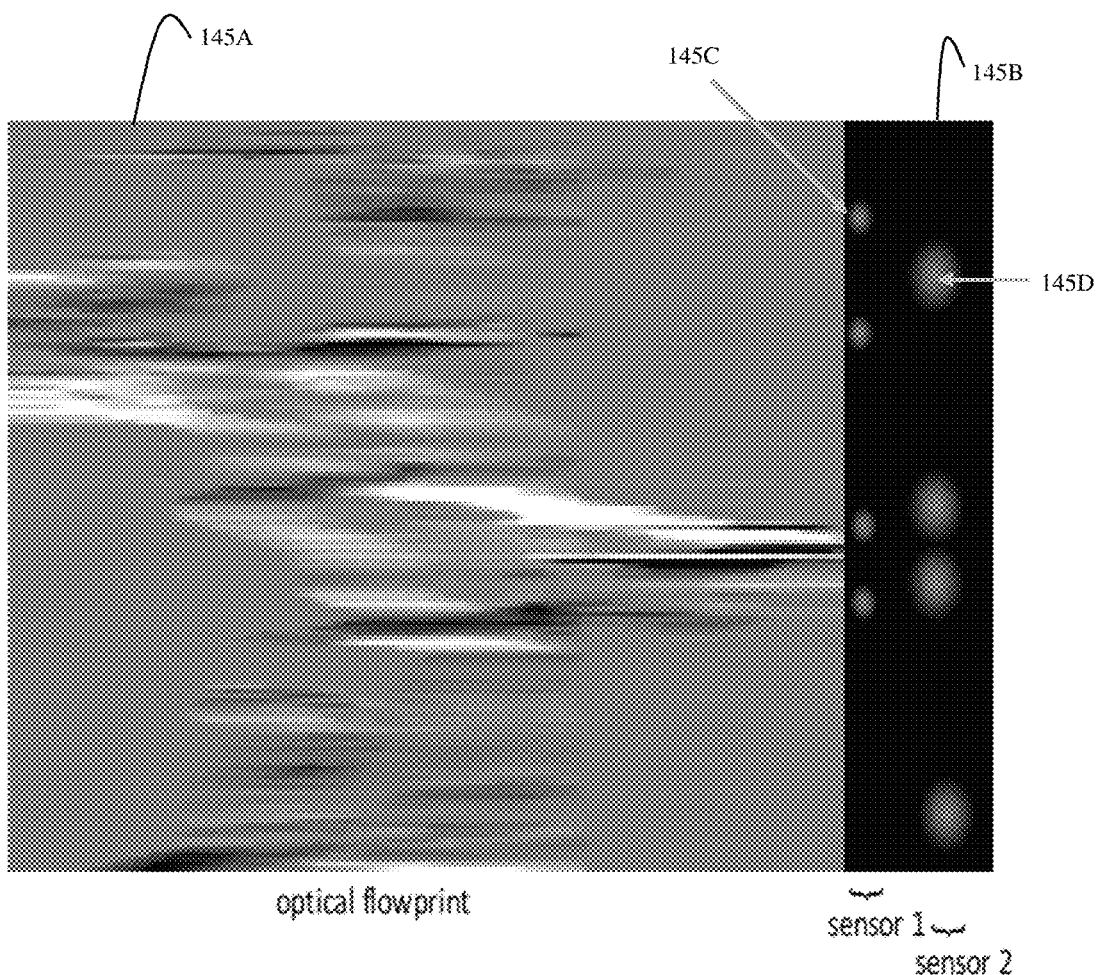
FIG. 1H is a diagram of a flowprint augmented with sensor data captured by two sensors, according to an example embodiment.

FIG. 1H is a diagram of a flowprint augmented with sensor data captured by two sensors, according to an example embodiment.

FIG. 1H illustrates a flowprint 145A augmented with sensor data 145B comprising first sensor data 145C from a first sensor and second sensor data 145D from a second sensor.

The flowprints can be augmented with data from other detectors, sensors, and devices to aid in the classification of an activity being modeled. In FIG. 1H data 145C and 145D from two sensors are being augmented into the time series for the flowprint 145A.

Flowprints are used to represent time series phenomena in a concise and efficient manner that makes them well suited for use in machine learning applications. It can be helpful, therefore, to augment them to include other time series data as well from other sources.

For example, in the example scenario shown in FIG. 1C, a cashier is scanning items at a grocery checkout. There may be multiple different detectors, sensors, signals, and even the output to other vision algorithms, that have data generated at specific times. Some of these may be useful, even corroborating, the activity being summarized by the flowprint generated by visual signature/flowprint manager 124.

In FIG. 1H, data 145C and 145D from two other sensor sources is being augmented into the time series of the flowprint 145A as augmented data 145B. Their locations along the columns indicate the data source to which they belong. Their position along the rows (the time axis) indicate the time these sensors devices emitted a signal. The shape and size of the sensor signals within the flowprint 145B can be used to model importance of the sensor signal, or the significance of it, especially in relation to the flowprint itself and the other sensor signals within the augmented flowprint. The shape and color (the data values) of the signals' image representation can be used to model the uncertainty (for example, in a Kalman filter sense) of the signals themselves.

Examples of sensors, signals, and visual detections that can be used to augment the flowprints include, but are not limited to scanner data, POS data, transaction information, weight scale readings, visual detections, tripwires, Electronic Article Surveillance (EAS) alerts, and any others.

In an embodiment, terminal 110 is a POS terminal, a Self-Service Terminal (SST), an Automated Teller Machine (ATM), or a kiosk.

In an embodiment, the video-based consuming applications 126 comprise machine-learning algorithms and/or security-based video applications for video tracking, monitoring, and security event generation.

Figure 2:
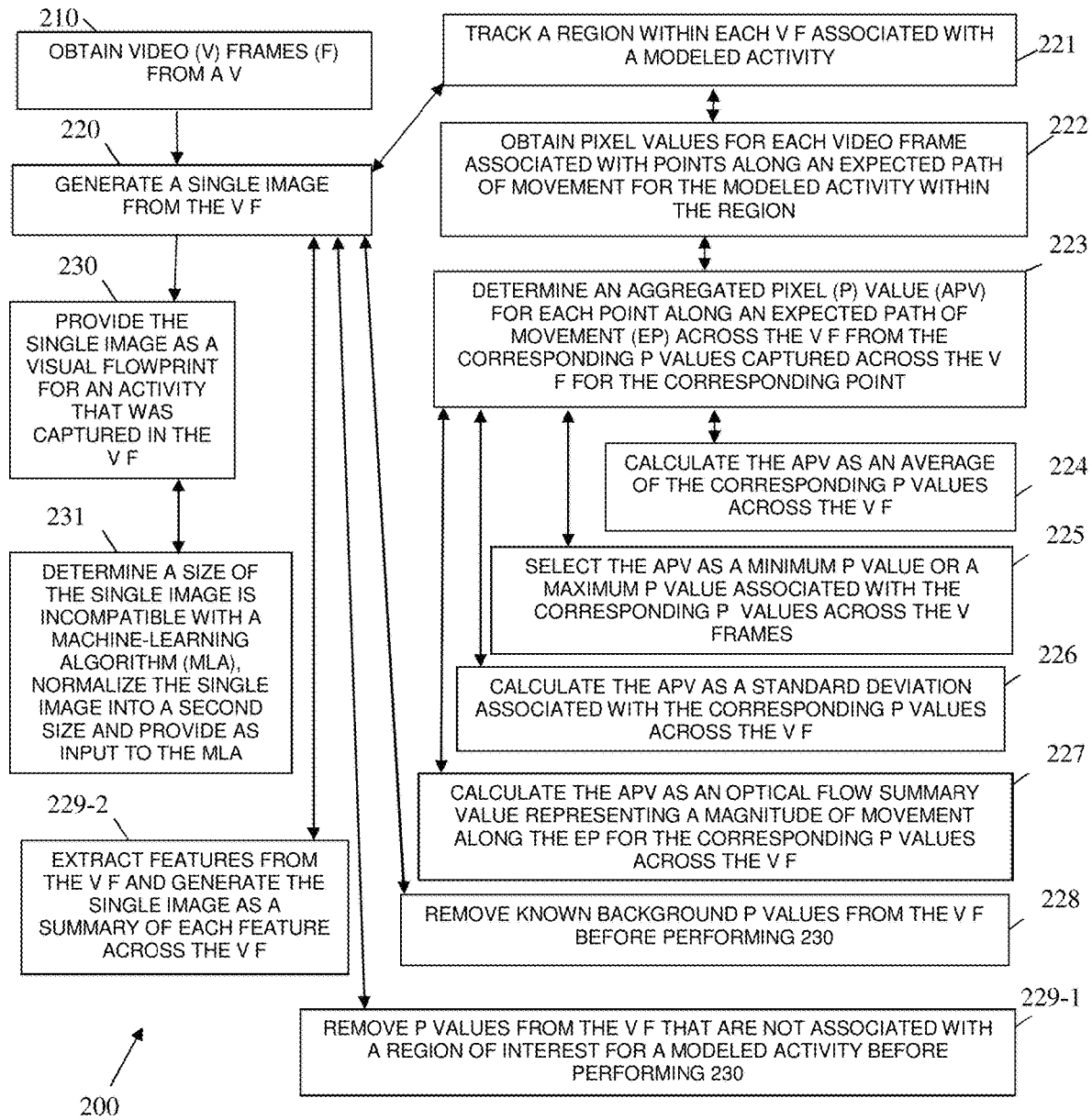
FIG. 2 is a diagram of a method for image/video analysis with activity signatures, according to an example embodiment.

The above-noted embodiments and other embodiments are now discussed with FIG. 2.

FIG. 2 is a diagram of a method 200 for image/video analysis with activity signatures, according to an example embodiment. The software module(s) that implements the method 200 is referred to as a "video activity feature generator." The video activity feature generator is implemented as executable instructions programmed and residing within memory and/or a non-transitory computer-readable (processor-readable) storage medium and executed by one or more processors of a device. The processor(s) of the device that executes the video activity feature generator are specifically configured and programmed to process the video activity feature generator. The video activity feature generator may have access to one or more network connections during its processing. The network connections can be wired, wireless, or a combination of wired and wireless.

In an embodiment, the video activity feature generator executes on server 120. In an embodiment, the server 120 is a POS terminal, a SST, an ATM, or a kiosk. In an embodiment, the server 120 is one of multiple servers that logically cooperate as a single server representing a cloud processing environment (cloud).

In an embodiment, the video activity feature generator is the visual signature/flowprint manager 124.

At 210, the video activity feature generator obtains vide frames from a video. The video can be a real-time video freed or can be a previously captured video.

At 220, the video activity feature generator generates a single image from the video frame or across all the video frames for the video.

In an embodiment, at 221, the video activity feature generator tracks a region within each video frame associated with a modeled activity.

In an embodiment of 221 and at 222, the video activity feature generator obtains pixel values for each video frame associated with points along an expected path of movement for the modeled activity within the region.

In an embodiment of 222 and at 223, the video activity feature generator determines an aggregated pixel value for each point along an expected path of movement across the video frames from the corresponding pixel values captures across the video frames for the corresponding point.

In an embodiment of 223 and at 224, the video activity feature generator calculates the aggregated pixel value as an average of the corresponding pixel values across the video frames.

In an embodiment of 223 and at 225, the video activity feature generator selects the aggregated pixel value as a minimum pixel value, or a maximum pixel value associated with the corresponding pixel values across the video frames.

In an embodiment of 223 and at 226, the video activity feature generator calculates the aggregated pixel value as a standard deviation associated with the corresponding pixel values across the video feed.

In an embodiment of 223 and at 227, the video activity feature generator calculates the aggregated pixel value as an optical flow summary value representing a magnitude of movement along the expected path of movement for the corresponding pixel values across the video frames.

In an embodiment of 220 and at 228, the video activity feature generator removes known background pixel values from the video frames before generating the single image at 220.

In an embodiment of 220 and at 229-1, the video activity feature generator removes pixel values from the video frames that are not associated with a region of interest for a modeled activity before generating the single image at 220.

In an embodiment of 220 and at 229-2, the video activity feature generator extracts features from the video frames and generates the single image as a summary of each feature across the video frames.

At 230, the video activity feature generator provides the single image as a visual flowprint or visual signature for an activity that was captured in the video frames.

In an embodiment, at 231, the video activity feature generator determines a size of the single image is incompatible with a second size that is expected with an input image as input to a machine-learning algorithm. The video activity feature generator normalizes the single image into the second size and provides the single image as input to the machine-learning algorithm. In an embodiment, the single image is normalized based on a color gradient expected by the machine-learning algorithm this may be in addition to the size or independent of the size when the single image is already in the size required for input by the machine-learning algorithm by is in an incorrect color gradient expected by the machine-learning algorithm.

Figure 3:
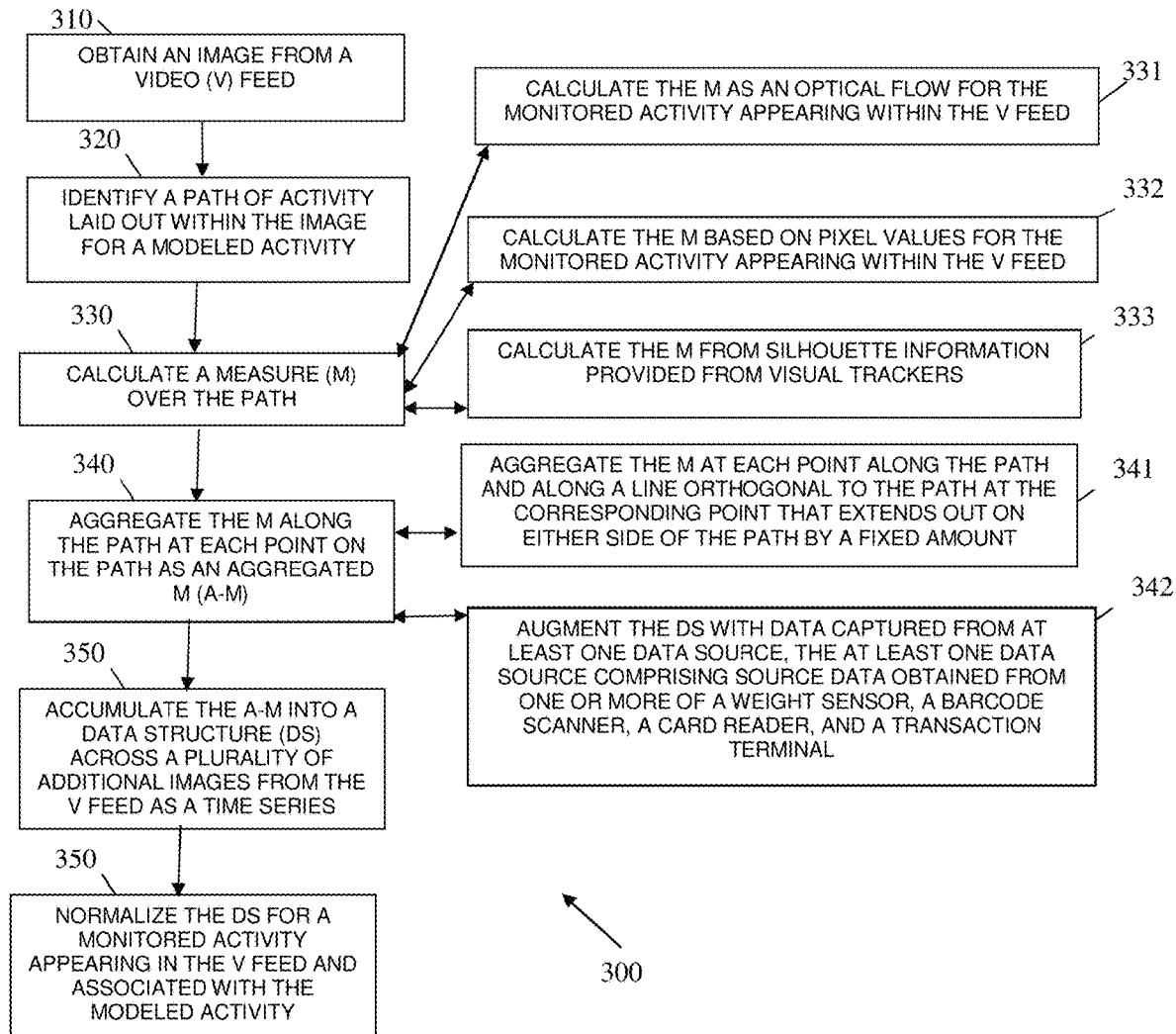
FIG. 3 is a diagram of another method for image/video analysis with activity signatures, according to an example embodiment

FIG. 3 is a diagram of a method 300 for image/video analysis with activity signatures, according to an example embodiment. The software module(s) that implements the method 300 is referred to as a "video activity analyzer." The video activity analyzer is implemented as executable instructions programmed and residing within memory and/or a non-transitory computer-readable (processor-readable) storage medium and executed by one or more processors of a device. The processor(s) of the device that executes the video activity analyzer are specifically configured and programmed to process the video activity analyzer. The video activity analyzer may have access to one or more network connections during its processing. The network connections can be wired, wireless, or a combination of wired and wireless.

In an embodiment, the devices that executes the video activity analyzer is server 120.

In an embodiment, the video activity analyzer is all of, or some combination of, visual signature/flowprint manager 124.

The video activity analyzer represents another and, in some ways, an enhanced processing perspective of what was discussed above for the method 200.

At 310, the video activity analyzer obtains at least one image from a video feed.

At 320, the video activity analyzer identifies a path of activity laid out within the image for a modeled activity.

At 330, the video activity analyzer calculates a measure over the path.

In an embodiment, at 331, the video activity analyzer calculates the measure as an optical flow for the monitored activity appearing within the video feed.

In an embodiment, at 332, the video activity analyzer calculates the measure based on pixel values for the monitored activity appearing within the video feed.

In an embodiment, at 333, the video activity analyzer calculates the measure from silhouette information provided from visual trackers.

At 340, the video activity analyzer aggregates the measure along the path at each point on the path as an aggregated measure.

In an embodiment, at 341, the video activity analyzer aggregates the measure at each point along the path and along a line orthogonal to the path at the corresponding point that extends out on either side of the path by a fixed amount.

In an embodiment, at 342, the video activity analyzer augments the data structure with data captured from at least one data source. The at least one data source comprising source data obtained from one or more of a weight sensor, a barcode scanner, a card reader, and a transaction terminal.

At 350, the video activity analyzer accumulates the aggregated measure into the data structure across a plurality of additional images from the video feed as a time series.

At 360, the video activity analyzer normalizes the data structure for the monitored activity appearing in the video feed and associated with the modeled activity.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
generating a single image from frames of video taken of an activity; wherein the single image is a set of rows generated from each of the frames of the video taken of the activity and the single image comprises a same number of rows as a corresponding number of rows of the frames;
identifying a region of interest in each of the fames of the video taken of the activity;
repeating for each corresponding frame of the video taken of the activity in a same temporal order the following:
generating a single row for the corresponding frame within the single image by summing or averaging pixels of a column corresponding to said region of interest for the corresponding frame of the video;
producing an activity signature for the activity from the single image comprising the frames of the summed or the averaged region of interest pixels; and
providing the activity signature as input data to evaluate the activity from the single image.

2. The method of claim 1, wherein generating the single image further includes removing first pixels from the frames of the video that are not associated with any region of interest that the activity is known to occur within for each of the frames of the video and producing remaining pixels for modified frames associated with said region of interest.

3. The method of claim 2, wherein generating the single row further includes combining corresponding remaining pixels for each pixel coordinate associated with said region of interest from the modified frames of the video into a single pixel for the corresponding pixel coordinate in the single image.

4. The method of claim 3, wherein combining further includes summing the remaining pixels for each pixel coordinate associated with said region of interest from the modified frames of the video producing a corresponding single pixel for a corresponding pixel coordinate of the single image.

5. The method of claim 2, wherein combining further includes averaging corresponding the remaining pixels for each pixel coordinate associated with said region of interest from the modified frames of the video producing the single pixel for the corresponding pixel coordinate of the single image.

6. The method of claim 1, wherein combining further includes producing the single image with a height corresponding to a total number of modified frames of the video to represent a time associated with the video taken.

7. The method of claim 6, wherein producing the single image with the height further includes normalizing single pixels within the single image for the pixel coordinates of said region of interest by resizing height to a model height.

8. The method of claim 7, wherein producing the activity signature further includes generating the activity signature as a matrix of pixels from the single pixels of the model height.

9. The method of claim 1, wherein providing further includes providing the activity signature as an input to a machine-learning algorithm that evaluates the activity from the activity signature instead of using the frames of the video as the input.

10. The method of claim 1, wherein providing further includes providing the activity signature as an input to a rules-based algorithm that evaluates the activity from the activity signature instead of using the frames of the video as the input.

11. The method of claim 1, wherein providing further includes providing the activity signature as an input to a security algorithm that evaluates the activity from the activity signature instead of using the frames of the video as the input.

12. A method, comprising:
producing a single image from a sequence of frames of a video for an identified region of interest captured in the video for an activity of each of the frames of the video, wherein a height of the single image corresponds to a time of the video, wherein the single image is a set of rows generated from each of the frames of the video, wherein the single image includes a same number of rows as a corresponding number of the frames for the video;
wherein producing further includes:
summing or averaging, for each frame of the video, pixels of a column corresponding to said region of interest; and
generating a single row for a corresponding frame in the single image based on the summing or the averaging corresponding to said region of interest in the corresponding frame of the video;
producing the single image as a sum or an average of the frames of the video that corresponding to said region of interest; and
providing the single image as an input to an algorithm that monitors said region of interest for the activity known to be associated with said region of interest.

13. The method of claim 12, wherein producing further includes normalizing the height of the single image to a model height associated with a model time duration expected by the algorithm as the input.

14. The method of claim 12, wherein producing further includes producing the single image as an activity flow signature for the activity within said region of interest.

15. The method of claim 12, wherein providing further providing the single image as the input to a machine-learning algorithm, wherein the algorithm is the machine-learning algorithm that evaluates the activity within said region of interest.

16. The method of claim 12, wherein providing further includes providing the single image as the input to a video tracking and monitoring algorithm, wherein the algorithm is the video tracking and monitoring algorithm that tracks and monitors the activity within said region of interest.

17. The method of claim 12, wherein providing further includes providing the single image as the input to a security algorithm, wherein the algorithm is the security algorithm that monitors security associated with the activity within said region of interest.

18. The method of claim 12, wherein providing further includes providing a model single image associated with the activity as an additional input to the algorithm for evaluating deviations in single image for the activity from the model single image associated with the activity.

19. A system, comprising:
a server comprising at least one processor and a non-transitory computer-readable storage medium;
the non-transitory computer-readable storage medium comprises executable instructions; and
the instructions executed by the at least one processor from the non-transitory computer-readable storage medium causing the at least one processor to perform operations comprising:
aggregating pixels from frames of a video into a single image, wherein the video records an activity for a region of interest;
wherein the single image is a set of rows generated from each of the frames of the video;
wherein the single image includes a same number of rows as a corresponding number of the frames;
wherein aggregating further includes:
repeating, for each frame of the video in a same temporal order, the following:
generating a single row of a corresponding frame of the video within the single image by summing or averaging pixels of a column corresponding to said region of interest for the corresponding frame;
producing an activity signature for the activity from the single image comprising the frames of the summed or the averaged region of interest pixels; and
providing the activity signature instead of the multiple frames to an algorithm as an input, wherein the algorithm tracks and monitors activities associated with said region of interest using the activity signature as the input.

20. The system of claim 19, wherein the algorithm is a machine-learning algorithm that evaluates the activities using the activity signature, wherein the algorithm is a rules-based algorithm that evaluates the activities using the activity signature, or wherein the algorithm is a security algorithm that evaluates security for the activities using the activity signature.

* * * * *